UNITED STATES PATENT OFFICE.

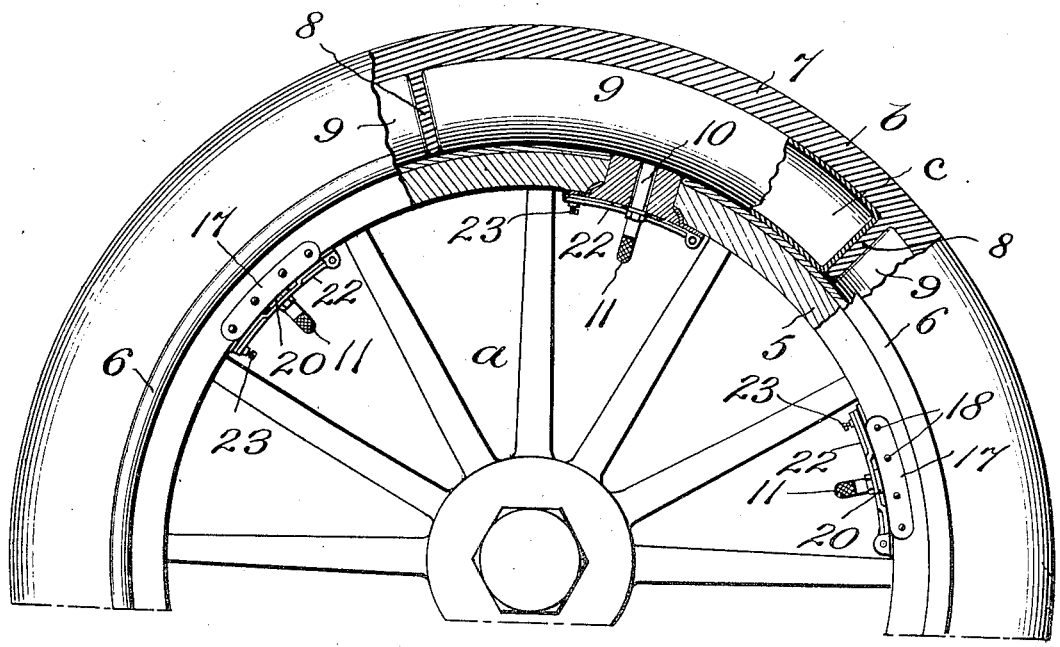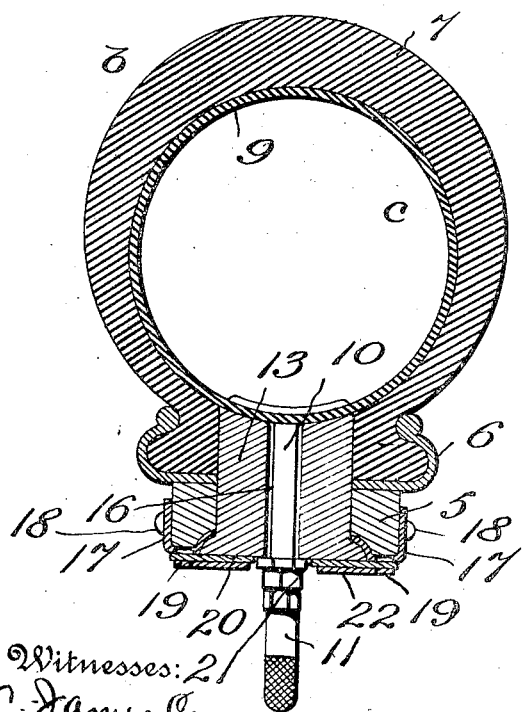

OTTAVIO ZANCAN, OF NEW YORK, N. Y.

VEHICLE-WHEEL.

1,133,779.   Specification of Letters Patent.   Patented Mar. 30, 1915.

Application filed June 12, 1914. Serial No. 844,703.

*To all whom it may concern:*

Be it known that I, OTTAVIO ZANCAN, a subject of the King of Italy, and resident of New York city, in the county of New York and State of New York, have invented certain new and useful Improvements in Vehicle-Wheels, of which the following is a specification.

The general object of the invention is to prevent the complete deflation of a pneumatic vehicle tire upon being punctured. And to this end the invention resides in forming the inner tube of such tire of a plurality of independent tube sections, each of which may be inflated irrespective of the others.

Other objects will appear and be better understood from that embodiment of my invention of which the following is a specification, reference being had to the accompanying drawings forming part hereof, in which:—

Figure 1 shows a segment of a vehicle wheel partly in section and elevation with my improved tire attached thereto. Fig. 2 is a detail cross section of the tire and the rim. Fig. 3 is a detail perspective showing the rim construction together with the bolster and the locking means for the bolster.

The felly 5 of the wheel *a* is provided with the usual rim 6 which may be of the demountable or any other preferred type. The tire *b* may be formed of any of the well known substances now employed in the manufacture of tires such as rubber or a combination of rubber and cloth. This tire comprises an outer portion or shoe 7, and an inner tube indicated generally by *c*. The shoe 7 is adapted in the ordinary manner for embracing the tube *c* and in external appearance corresponds to that of the ordinary shoe; evidently however this shoe 7 is somewhat peculiarly formed in that it has inwardly directed radial partitions 8 spaced apart for equal and suitable distances, the space between adjacent partitions forming compartments, the function of which will hereinafter appear.

Referring now to Fig. 1, it will be observed that the tire *b* is formed of a plurality of sections 9, the ends of each of which are closed. These sections are preferably formed of soft rubber and in area correspond approximately to the area of the compartments between the partitions 8. As will be observed by reference to Fig. 1, the tube sections which are disposed in the said compartments completely fill these when inflated as shown. Each tube section is provided with a nipple 10 adapted for connection to the ordinary inflating apparatus, and a cap 11 is provided for each nipple. Manifestly with this construction the sections 9 are independently inflatable and as a result of this and of the other constructions and arrangements the deflation by puncture of any section will not affect or disturb the condition of the other sections. When the outer casing or shoe is adjusted into position on the rim 6, the sections 9 before being inflated may be introduced into their respective compartments by passing them through openings in the felly 5, and alining openings formed by the presence of grooves in the adjacent edges of the shoe 7. One of the rim openings is shown in Fig. 3 and indicated by 12. The openings formed by grooves in the adjacent edges of the shoe correspond in area to the openings 12.

In Fig. 3, 13 indicates a plug of suitable material for the opening 12. In the same figure it will be observed that the outer end of the opening 12 is counter-bored as indicated by 14 and that the outer end of the plug 13 is provided with a head so positioned as to nest within the counter-bore 14 and be flush with the inner surface of the felly 5. In length the plug 13 is such that it will extend through the opening formed by the grooves in the adjacent edges of the shoe and by thus functioning as a fillet for the opening 12 it will additionally function as a bolster for the tube section 9. The plug 13 is centrally provided with an opening 16 which receives the nipple 10 upon adjusting the plug into the opening 12 and before applying the cap 11 to the nipple 10. 17 indicates a bearing plate surrounding the opening 12. The bearing plate is channeled and its sides bear on the sides of the rim and are secured by suitable fastening elements such as tacks 18. The body portion of the plate 17 is provided with keepers 19—19 herein shown as upstruck from the said body and arranged for receiving the opposite ends of the lock in the form of an oblong plate 20 provided with an opening 21 for receiving the nipple 10. When the lock 20 is positioned as shown in Fig. 2 it extends transversely of the plug 13 and bears upon the head thereof and thus operates to hold the plug against displacement. 22 indicates supplementary lock pivoted at one end to one end of the plate 17 and adapted to be swung over the lock 20 when the same is positioned as shown in Fig. 2 and to have its free end removably secured in any preferable manner to the plate such as by a thumb screw 23 which may be screwed through the plate 17 and into an opening in the felly 5.

Obviously with the foregoing structure it will not be necessary to demount the shoe in the event of any of the tube sections of the tire becoming deflated by puncture or otherwise, because in the event of such deflating the plug may be readily removed after opening the lock and the supplementary lock whereupon the defective section may be drawn through the opening 12 by pulling on the nipple of such section. It will here be observed that, when that segment of the wheel containing the defective section is located, by turning the wheel until the said segment is uppermost in the wheel, will permit of withdrawing the defective tube section, without requiring jacking of the wheel axle.

What I claim as new is:—

In combination a wheel including a felly, having openings, channeled bearing plates surrounding the openings, plugs arranged in the openings, keepers mounted on the bearing plates, a locking plate coöperating with the keepers to hold the plugs against displacement, a supplemental locking plate having one end pivotally connected and its opposite end detachably connected to the bearing plate for preventing the turning of the first mentioned locking plate, and a pneumatic tire arranged on the wheel and including inner tube sections bearing on the plugs and having nipples extending through the plugs and locking plates.

Signed at New York in the county of New York and State of New York this 9th day of June A. D. 1914.

OTTAVIO ZANCAN.

Witnesses:
 FRED A. KUNEMUND,
 C. JAMES CRONIN.